United States Patent
Paudel et al.

(10) Patent No.: US 11,829,738 B2
(45) Date of Patent: Nov. 28, 2023

(54) STATIC BLOCK FREQUENCY PREDICTION IN IRREDUCIBLE LOOPS WITHIN COMPUTER CODE

(71) Applicant: INTERNATIONAL BUSINESS MACHINES CORPORATION, Armonk, NY (US)

(72) Inventors: Jeeva Paudel, North York (CA); Shimin Cui, North York (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 131 days.

(21) Appl. No.: 17/643,665

(22) Filed: Dec. 10, 2021

(65) Prior Publication Data
US 2023/0185551 A1    Jun. 15, 2023

(51) Int. Cl.
G06F 8/41    (2018.01)

(52) U.S. Cl.
CPC ................... G06F 8/4441 (2013.01)

(58) Field of Classification Search
CPC ..... G06F 8/4441; G06F 8/4442; G06F 8/4443
See application file for complete search history.

(56) References Cited

U.S. PATENT DOCUMENTS

| | | |
|---|---|---|
| 5,655,122 A | 8/1997 | Wu |
| 6,286,135 B1 * | 9/2001 | Santhanam ............ G06F 8/443 717/146 |
| 6,415,433 B1 * | 7/2002 | Callahan, II ............ G06F 8/443 717/124 |
| 7,516,448 B1 * | 4/2009 | Chan ....................... G06F 8/443 717/154 |

(Continued)

FOREIGN PATENT DOCUMENTS

CN    105183650 B    3/2018

OTHER PUBLICATIONS

IBM, "z/Architecture—Principles of Operation," IBM Publication No. SA22-7832-12, Thirteenth Edition, Sep. 2019, pp. Jan. 2000.

(Continued)

*Primary Examiner* — Wei Y Zhen
*Assistant Examiner* — Amir Soltanzadeh
(74) *Attorney, Agent, or Firm* — Eric Chesley, Esq.; Blanche E. Schiller, Esq.; Heslin Rothenberg Farley & Mesiti P.C.

(57) ABSTRACT

A block frequency of a block in an irreducible loop in computer code is statically determined. The statically determining includes splitting an incoming block mass among multiple loop headers of the irreducible loop to provide an initial mass for the block. A bottom-up traversal and a top-down traversal of a plurality of loops of the computer code including the irreducible loop are iteratively performed to update a mass of the block. The iteratively performing commences with propagating the initial mass of the block to one or more blocks of one or more loops of the plurality of loops and continues with propagating and updating masses of select blocks of the plurality of loops until a predefined point is reached providing a resulting mass for the block. The block frequency of the block is determined using the resulting mass and is to be used in processing associated with the computer code.

20 Claims, 8 Drawing Sheets

(56) References Cited

U.S. PATENT DOCUMENTS

| | | |
|---|---|---|
| 8,201,160 B2 | 6/2012 | Hauser |
| 8,843,902 B2 | 9/2014 | Stanford-Jason |
| 2018/0143813 A1* | 5/2018 | Meyer .................... G06F 8/456 |

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.
Ball, Thomas et al., "Branch Prediction for Free," In Proceedings of the Conference on Programming Language Design and Implementation, Jun. 1993, pp. 300-313.
Wu, Youfeng et al., "Static Branch Frequency and Program Profile Analysis," In Proceedings of the International Symposium on Microarchitecture, Nov. 1994, pp. 1-11.
Zhang, Weizhe et al., "Predicting HPC Parallel Program Performance Based on LLVM Compiler," Cluster Comput, Jun. 2017, pp. 1179-1192.
Grace Period Disclosure: IBM® Open XL C/C++ Compiler, Sep. 2021, (7 pages), https://www.ibm.com/products/xl-cpp-aix-compiler-power.
Grace Period Disclosure: IBM® Open XL Fortran Compiler, Sep. 2021, (6 pages), https://www.ibm.com/products/xl-fortran-aix-compiler-power.
Transmittal Letter Regarding Confidential Activity, Dec. 14, 2021, (1 page).

* cited by examiner

310

```
Entry: {
    S1:     for (i = 0; i < N; ) {
    S2:         if (f1( )) goto S4;
300 S3:         if (f2( )) goto S6;
    S4:         if (f3( )) goto S7;
                    else goto S3;
    S5:         f4( );
    S6:         f5( );
    S7:         i = i + 1
    S8:     }
Exit:   }
```

FIG. 3

STATIC BLOCK FREQUENCY PREDICTION IN IRREDUCIBLE LOOPS WITHIN COMPUTER CODE

STATEMENT REGARDING PRIOR DISCLOSURES

The following disclosure(s) are submitted under 35 U.S.C. 102(b)(1)(A):
DISCLOSURE(S): IBM® Open XL C/C++ Compiler, September 2021; and IBM® Open XL Fortran Compiler, September 2021.

BACKGROUND

One or more aspects relate, in general, to processing within a computing environment, and in particular, to facilitating such processing.

Processing within a computing environment includes executing computer programs that perform various tasks. Programs are typically written in a program code, referred to as source code, which is not understood by a machine, such as a computer. However, the source code is translated to machine code, referred to as machine language, which is understandable by a computer. This translation may be performed using a compiler. There are many available compilers, and different compilers offer different features. One feature that is offered is an optimization feature in which one or more optimizations are applied to the program to enhance program performance.

Optimizations to be applied may be selected based on program performance, and therefore, one or more performance evaluations are performed to determine program performance.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes statically determining a block frequency of a block in an irreducible loop in computer code. The statically determining includes splitting an incoming block mass among multiple loop headers of the irreducible loop to provide an initial mass for the block. A bottom-up traversal and a top-down traversal of a plurality of loops of the computer code including the irreducible loop are iteratively performed to update a mass of the block. The iteratively performing commences with propagating to one or more blocks of one or more loops of the plurality of loops the initial mass of the block, and continues with propagating and updating masses of select blocks of the plurality of loops until a pre-defined point is reached providing a resulting mass for the block. The block frequency of the block is determined using the resulting mass and is to be used in processing associated with the computer code.

Computer-implemented methods and computer systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3 depicts one example of an irreducible loop, in accordance with one or more aspects of the present invention;

DETAILED DESCRIPTION

In one or more aspects, a capability is provided to facilitate processing within a computing environment. For instance, block frequencies of blocks in irreducible loops within computer code are statically predicted, and this information is used to perform, e.g., compiler optimizations/transformations to improve execution of the computer code (e.g., program, application, module, function, procedure, etc.) using those blocks.

Computer code may have loops, including reducible and irreducible loops. Irreducible loops are strongly connected components with multiple entry blocks. In one example, irreducible strongly connected components are modeled as loops with multiple headers (also referred to as loop headers). Irreducible loop headers include entry blocks and nodes that are targets of a back edge within the strongly connected components—excluding back edges within true sub-loops.

In one or more aspects, a capability is provided for estimating or predicting block frequency for blocks within loops, such as irreducible loops. Block frequency is a relative metric that represents the number of times a block executes and is computed, in one example, as: bfreq(b)= mass(b)*mass(L)*scale(L), where bfreq(b) represents block frequency of a block b, mass(b) is a mass of block b in the range of (e.g., 0.0, 1.0) as determined by incoming branch frequencies, mass(L) is a mass of enclosing loop L's pseudo nodes, and scale(L) is an enclosing loop L's scale. Loop scale represents the number of loop iterations per entry.

To improve estimations of block frequency, in one example, a more accurate computation for mass(b)—mass of a block—is provided, in accordance with one or more aspects of the present invention. Thus, in one or more aspects, the capability includes, for instance, principled splitting of an incoming block mass amongst multiple headers of an irreducible loop to obtain an initial mass for each of the blocks of the irreducible loop, and iteratively propagating the initial masses in bottom-up and top-down processing across reducible and irreducible regions to yield accurate block mass estimates. Initial block mass assignments are based, for instance, on start terms of an infinite geometric series formed from incoming branch frequencies, and an entry block's mass, as described herein.

Figure 1:
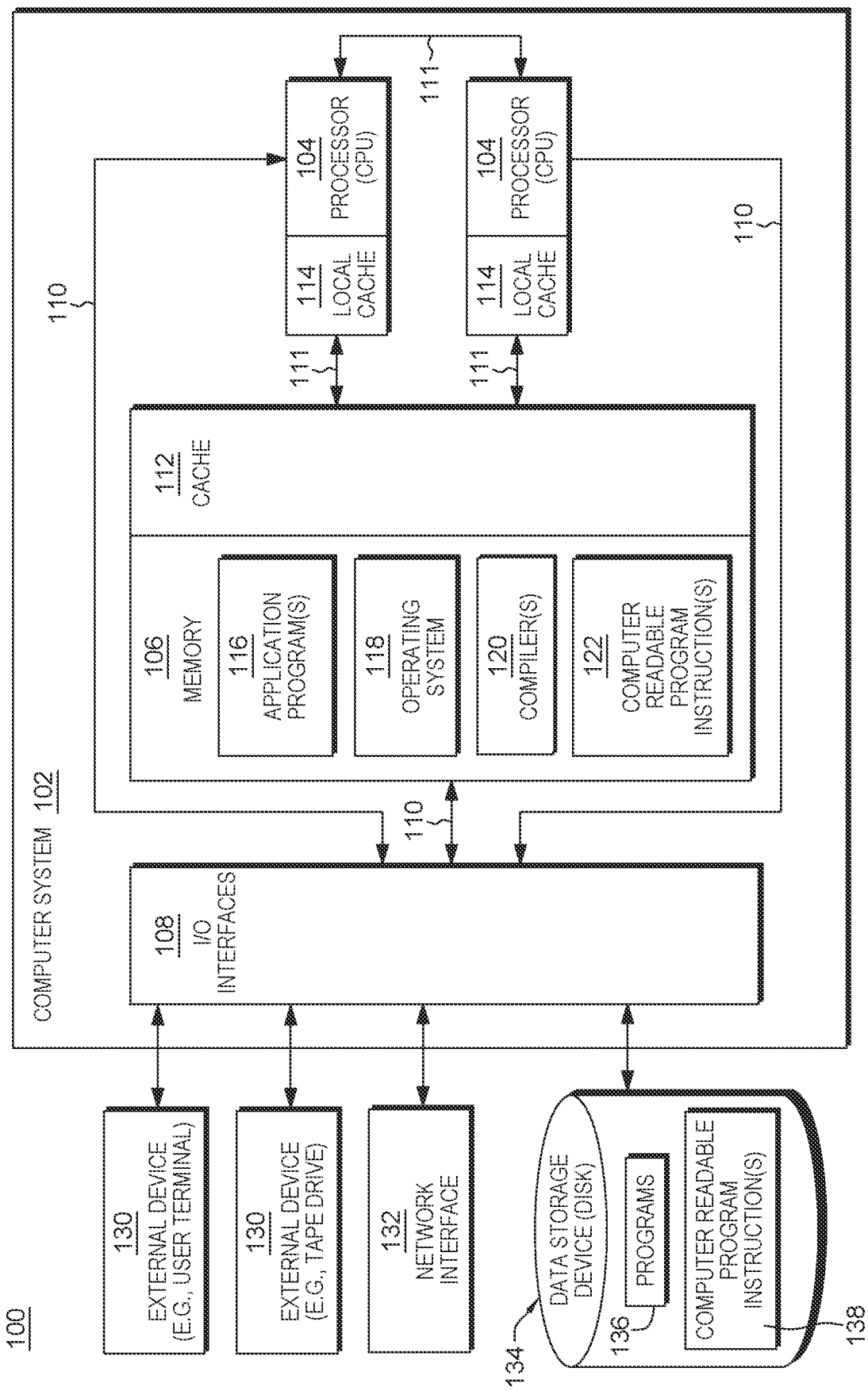
FIG. 1 depicts one example of a computing environment to include and/or use one or more aspects of the present invention.

In one aspect, static block frequency prediction processing is performed by e.g., a processor, and in one example, by a compiler executing on a processor. One example of a computing environment executing such a processor is described with reference to FIG. 1. As an example, the computing environment of FIG. 1 is based on the IBM® Power® instruction set architecture offered by International Business Machines Corporation, Armonk, New York. However, the Power instruction set architecture is only one instruction set architecture to be used; other instruction set architectures offered by International Business Machines Corporation and/or other corporations, entities, etc. may be used. IBM and Power are registered trademarks or trademarks of International Business Machines Corporation in at least one jurisdiction.

Referring to FIG. 1, in one example, a computing environment 100 includes, for instance, a computer system 102 shown, e.g., in the form of a general-purpose computing device. Computer system 102 may include, but is not limited to, one or more processors or processing units 104 (e.g., central processing units (CPUs) and/or special-purpose processors, etc.), a memory 106 (a.k.a., system memory, main memory, main storage, central storage or storage, as examples), and one or more input/output (I/O) interfaces 108, coupled to one another via one or more buses and/or other connections. For instance, processors 104 and memory 106 are coupled to I/O interfaces 108 via one or more buses 110, and processors 104 are coupled to one another via one or more buses 111.

Bus 111 is, for instance, a memory or cache coherence bus, and bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 112, such as a shared cache, which may be coupled to local caches 114 of one or more processors 104 via, e.g., one or more buses 111. Further, memory 106 may include one or more programs or applications 116, at least one operating system 118, one or more compilers 120 and one or more computer readable program instructions 122. Computer readable program instructions 122 may be configured to carry out functions of embodiments of aspects of the invention.

Computer system 102 may communicate via, e.g., I/O interfaces 108 with one or more external devices 130, such as a user terminal, a tape drive, a pointing device, a display, and one or more data storage devices 134, etc. A data storage device 134 may store one or more programs 136, one or more computer readable program instructions 138, and/or data, etc. The computer readable program instructions may be configured to carry out functions of embodiments of aspects of the invention.

Computer system 102 may also communicate via, e.g., I/O interfaces 108 with network interface 132, which enables computer system 102 to communicate with one or more networks, such as a local area network (LAN), a general wide area network (WAN), and/or a public network (e.g., the Internet), providing communication with other computing devices or systems.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general-purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

As described herein, in one aspect, a compiler (e.g., compiler 120) of a processor (e.g., processor 104) includes a technique for estimating block masses and therefrom, block frequencies, in accordance with one or more aspects of the present invention. For instance, a technique is provided for performing static block mass/frequency prediction in irreducible loops within computer code. Static prediction is performed, for instance, without executing the program.

In one or more aspects, the technique includes one or more of: for each irreducible strongly connected component, find its parent node(s); partially compute/distribute mass in the parent loop—model enclosed irreducible strongly connected component as a pseudo-node while computing mass in the parent loop; compute start term of infinite geometric series (e.g., for first iteration) using the entry mass to the strongly connected component obtained from the exit branch frequency of its parent loop—also, compute the ratio of the infinite geometric series; update (e.g., for subsequent iterations) previously assigned values using the geometric ratio computed; compute the relative entry masses of each of the multiple headers of the current irreducible strongly connected component using the geometric terms computed above; compute mass in the strongly connected component, and propagate mass to enclosing parent loops all the way up to the outermost loop—this is accomplished through, e.g., bottom-up traversal of loops; propagate the computed mass through directed acyclic graphs corresponding to each strongly connected component through, e.g., top-down traversal of the loops; compute a final mass for each block, and each exit, and a total back edge mass used for computing loop scale as a sum of the iterations; and based on achieving a predetermined threshold of fixed-point convergence of back edge mass, assigning the final mass of the irreducible strongly connect component distributed among loop headers proportionally according to a mass flowing through respective back edges.

Further details regarding a technique for estimation of block mass used to predict block frequency are described with reference to FIG. 2. As shown, in one example, there is a bottom-up traversal 200, a top-down traversal 250, and iterated bottom-up and top-down traversals until fixed-point convergence of block masses 290. Starting, in one example with bottom-up traversal 200, an initial block mass is assigned to each loop header in an irreducible loop using, e.g., start terms of geometric series formed from incident branch frequencies 210. This is described further with reference to FIGS. 3 and 4A-4B.

Figure 4A:
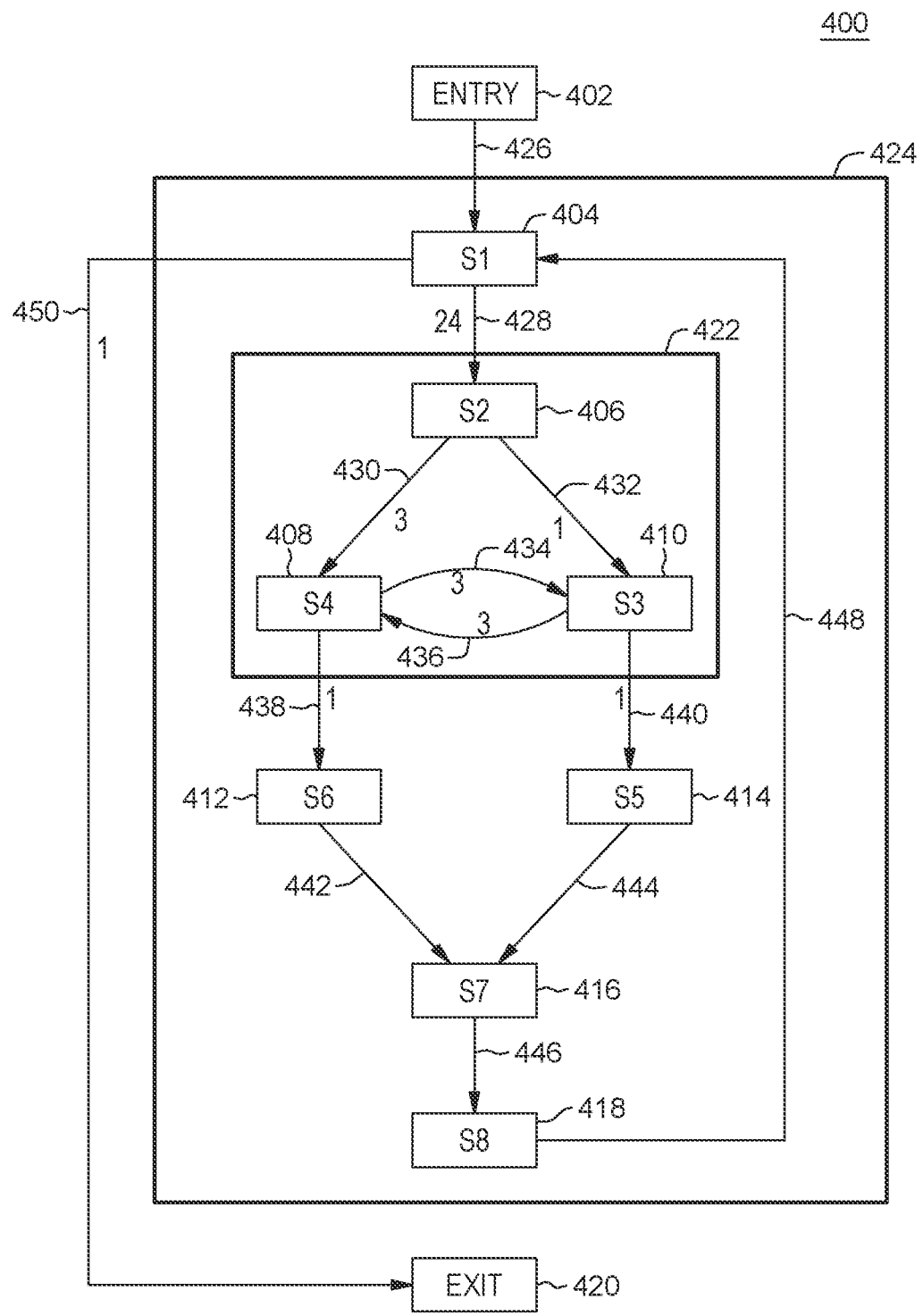
FIG. 4A depicts one example of a control flow graph of the irreducible loop of FIG. 3, in accordance with one or more aspects of the present invention.

FIG. 3 depicts one example of an irreducible loop 300 enclosed within a reducible loop 310, and FIG. 4A depicts one example of a control flow graph 400 for the nested reducible loop. In one example, boxes 406-410 represent basic blocks of an irreducible loop 422 (e.g., irreducible loop 300), and edges 430-436 represent possible flows of control with irreducible loop 422. Loop 422 is an irreducible loop, since node 406, in this example, does not dominate all the nodes (e.g., 408 and 410) in the strongly connected component (e.g., irreducible loop 422). Besides the irreducible loop 422, the reducible loop 424 also contains basic blocks represented by boxes 402-404, and 412-418, and flow control edges 426, 428, and 438-448.

Figure 4B:
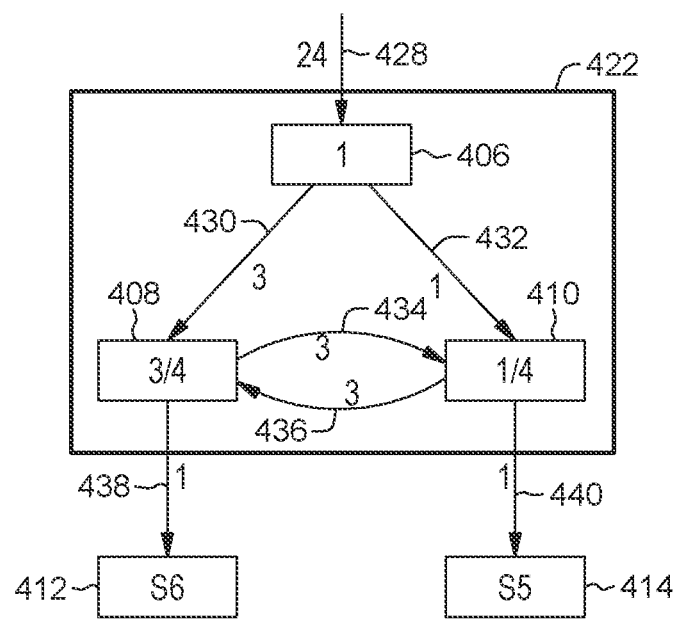
FIG. 4B depicts one example of a control flow graph of the irreducible loop of FIG. 3 with initial block mass distribution assignments, in accordance with one or more aspects of the present invention.

One example of initial block mass distribution for irreducible loop 422 is depicted in the control flow graph of FIG. 4B. The numbers inside boxes 406-410 represent block mass distribution. The numbers on edges 430, 432 represent relative branch frequencies from box 406 to 408 and 406 to 410, respectively. The numbers on edges 438, 434 represent relative branch frequencies from box 408 to 412 and 408 to 410, respectively, and the numbers on edges 440, 436 represent relative branch frequencies from box 410 to 414 and 410 to 408, respectively.

Consider, for instance, that the mass of the entry block 406 of irreducible loop 422 is 1.0, and an initial block mass distribution is as depicted in FIG. 4B. In one example, the mass of each successor block 408, 410 is determined based on, e.g., the mass of entry block 406 (e.g., 1) and branch frequency (e.g., 3 and 1, respectively). The fixed point convergence goal, in accordance with one or more aspects of the present invention, is to iteratively distribute the mass to infinity. In the first iteration, the entry block propagates $3/4^{th}$ of the mass to BB1 (basic block 1) 408 and $1/4^{th}$ to BB2 (basic block 2) 410. In each subsequent iteration, BB1 and BB2 propagate $3/4^{th}$ of what they possess to each other. As an example, the start terms are computed as a sum of geometric series (e.g., First term*$(1-r^n)/(1-r)$), where n is the number of terms (e.g., infinite) and r is the common ratio. For instance:

$$BB1 = 3/4 + 1/4 * 3/4 + 1/4 * 3^2/4^2 + 1/4 * 3^3/4^3 + 3/4 * 3^4/4^4 + \ldots$$

$$BB2 = 1/4 + 3/4 * 3/4 + 1/4 * 3^2/4^2 + 3/4 * 3^3/4^3 + 1/4 * 3^4/4^4 + \ldots$$

To devise a matching infinite series for both blocks, a simplification is performed by splitting up the odd and even terms of the series and taking out factors, an example of which is below. The start terms computed above are used to assign an initial mass to each block as follows, in one example.

$$BB1 = 15/16 * (9^0/16^0 + 9^1/16^1 + 9^2/16^2 + \ldots)$$

$$BB2 = 13/16 * (9^0/16^0 + 9^1/16^1 + 9^2/16^2 + \ldots)$$

The sum of this geometric series is $1/(1-9/16) = 16/7$. Therefore, in this example, the convergence mass for BB1=15/7 and for BB2=13/7. Modeling BB1 and BB2 as members of the same loop yields an exit mass of ¼ for the whole loop. Thus, the loop scale is to be 4.

Based on the foregoing, returning to FIG. 2, the initial masses are initialized 210 for each header block, respectively, of irreducible loop 215. Since the masses computed to the irreducible loop's header blocks are still being refined by propagating masses of enclosed loops to enclosing loops and later from outer loops to inner loops 290, these masses computed are referred to as initial masses in the first iteration and partial masses in subsequent iterations.

Further, in one example, enclosed irreducible loop 215 is modeled as a directed acyclic graph by ignoring back edges 212.

Moreover, a partial mass (initial masses for the first iteration) of a block of an enclosed loop is propagated to a block of an enclosing loop 225 (based on the edges of the directed acyclic graph) to update its previous mass (e.g., previously assigned or computed partial mass) 220. For instance, in a first iteration, the initially assigned masses of the blocks of the irreducible loop are propagated to the blocks of the enclosing loop, based, e.g., on the directed acyclic graph, to update their previously assigned masses. For subsequent iterations, the partial masses of the enclosed loop are propagated to the blocks of the enclosing loop to update their previously computed partial masses. In one example, referring to FIG. 4A, the mass (15/7) of block 408 for irreducible loop 422 is propagated to block 412 of enclosing reducible loop 424, and the mass of block 412 propagated from flow control edge 438 is 15/7*(¼)=15/28. Further, the mass (13/7) of block 410 for irreducible loop 422 is propagated to block 414 of enclosing reducible loop 424, and the mass of block 414 propagated from flow control edge 440 is 13/7*(¼)=13/28.

Figure 2:
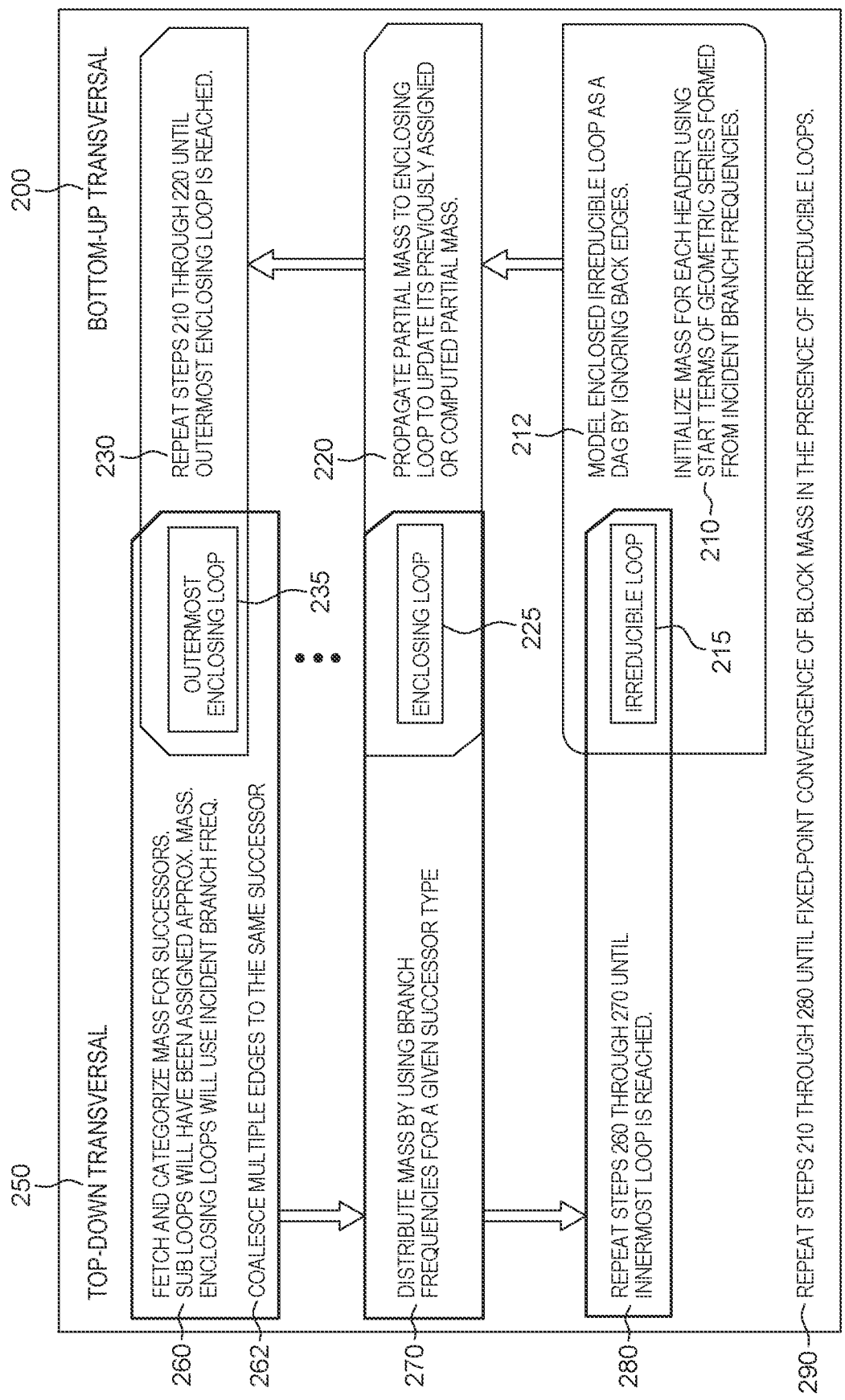
FIG. 2 depicts one example of processing used to predict block frequencies, in accordance with one or more aspects of the present invention.

In FIG. 2, operations 210, 212 and 220 are repeated for each level of the loop nest until an outermost enclosing loop 235 is reached 230. For instance, the updated masses are propagated to successor blocks in the enclosing loops and if there are other irreducible loops encountered in the traversal, the masses for the headers of each irreducible loop are initialized as in operation 210.

Based on an iteration of bottom-up traversal 200, top-down traversal 250 commences using the most up-to-date masses generated from the bottom-up traversal 200. In one example, this includes fetching and categorizing the masses for successor blocks (also referred to as successors) 260. In one example, referring to FIG. 4A, the successors of box 404 (the header of loop 424) includes, for instance: box 420, which is outside of loop 424, so the edge 450 from box 404 to box 420 is categorized as an exit edge to the enclosing region; box 418 is within loop 424, and as the edge 448 from box 418 to box 404 is to the loop header, the edge is categorized as a back edge; box 406 is within loop 424, so the edge 428 from box 404 to box 406 is categorized as a local edge. Also, box 406 is the header of the inner irreducible loop, so the edge from box 404 to box 406 is a local edge to the enclosed loop.

Returning to FIG. 2, sub-loops are assigned approximate masses, and enclosing loops use incident branch frequencies. Multiple edges to the same successor block are coalesced 262. Further, in one example, masses of blocks of the enclosing loop are distributed to their successors by using branch frequencies for a given successor type 270. In on example, referring to FIG. 4A, consider, for instance, the initial mass of the box 404, the header of the loop 424, is 1 and the branch frequency to box 420 is 1 and to box 406 is 24. This value 1 of the mass of box 404 is distributed to box 420 with, e.g., a value of $1*(1/(24+1))=1/25$, and to box 406, the header of the inner irreducible loop, with, e.g., a value of $1*(24/(24+1))=24/25$. In another example, consider, for instance, the initial mass of the entry box 402 is 1, the branch frequency from box 418 to box 404 is 24, so the scale for the loop 422 is 25 as a result of the incoming two edges from box 402 and box 418, and the mass for the box 404 is updated as 1+24=25.

Returning to FIG. 2, operations 260, 262 and 270 are repeated until the innermost loop is reached 280.

Further, in one example, operations 210, 212, 220, 230, 260, 262, 270 and 280 are repeated 290 until a predefined point, such as a fixed-point convergence of the block mass in the presence of irreducible loops. In the subsequent operations, however, the mass is not initialized in 210 but instead the updated partial mass is used.

As described, in one or more aspects, mass is propagated iteratively through reducible and irreducible regions by iterated bottom-up and top-down traversals of the loops until fixed-point convergence of the back edge mass. Each iteration starts by assigning the entry blocks their back edge mass from the prior iteration. The initialization of header masses using geometric start terms occurs at the first iteration. Subsequent iterations update the previously assigned values using the geometric ratios. The final mass for each block (and each exit, and the total back edge mass used for computing loop scale) is, e.g., the sum of the iterations.

Initial splitting of incoming mass amongst multiple headers using geometric start terms improves the accuracy of overall estimation of block frequencies in the presence of irreducible loops. Based on the header masses converging to fixed points, techniques may be leveraged to propagate the masses through, e.g., directed acyclic graphs and functions. At the end of propagation, the full mass assigned to the irreducible strongly connected components will be distributed among the loop headers proportionally according to the true mass flowing through their back edges.

Described herein is a capability for predicting block frequencies for blocks in irreducible loops. In one example, mass b is predicted, as described above, and then used to compute a block frequency. This provides a more accurate static block frequency prediction for loops, such as irreducible loops. In one or more aspects, given the control flow graph of a user program, and relative branch frequencies, accurate block frequencies are statically computed through iterative bottom-up and top-down traversal of natural loops and irreducible loops (in any order, and for any combination of nesting) while distributing entry mass of the blocks to the successors and enclosed blocks. The initial distribution of mass amongst multiple headers of irreducible loops is based on the start term and ratio of the geometric series formed from the incoming branch frequencies. The resulting block frequency estimates reflect true runtime characteristic of the basic blocks.

One or more aspects provide a robust and uniform approach for unified treatment of irreducible and reducible loops towards computing block frequency estimates. In one or more aspects, profiling information is not needed; the technique applies to different types of programs, including parallel and sequential programs; and the technique is independent of (e.g., not dependent on) the intermediate compiler language or compiler infrastructure.

One or more aspects of the present invention are inextricably tied to computer technology and facilitate processing within a computer, improving performance thereof. The use of a process to predict block frequencies of loops, including irreducible loops, allows the loops to run faster and improves performance within a computing environment. Irreducible loops are prevalent in, e.g., scientific programs, safety-critical programs, programs including extensive error handling code, and are often introduced by compiler optimizations. Irreducible and reducible loops interact, such as through nesting, and cross-iterations. They may also interact in the following ways, for example: in a true loop nested inside an irreducible loop, irreducible control flow in a branch that belongs to a true loop, and irreducible control flow between two loops. Improving the accuracy of block frequency estimates for irreducible loops improves the overall accuracy of block frequency estimates in programs including both reducible and irreducible regions. Block frequency is used for, e.g., profitability analyses that drive several optimizations, such as procedure gluing, loop vectorization, data layout modifications, and tail call optimizations. Accurate estimation of block frequency is used to effectively employ such optimizations.

Although embodiments are described herein, other variations and/or embodiments are possible.

Figure 5A:
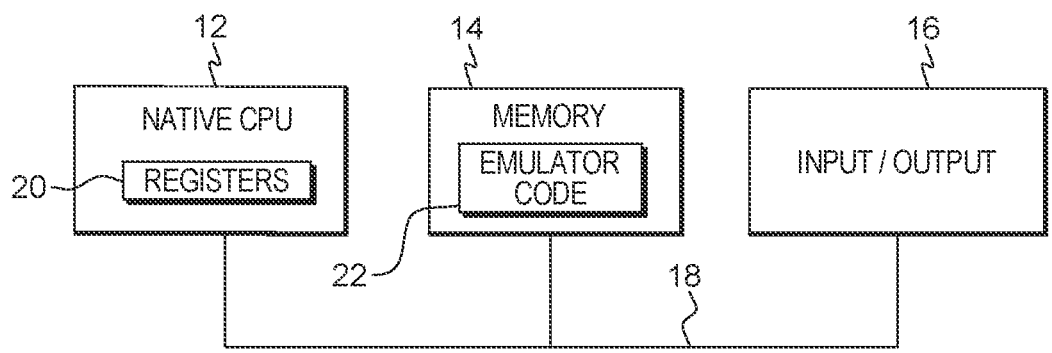
FIG. 5A depicts another example of a computing environment to incorporate and/or use one or more aspects of the present invention.

Another example of a computing environment to incorporate and use one or more aspects of the present invention is described with reference to FIG. 5A. In this example, a computing environment 10 includes, for instance, a native central processing unit (CPU) 12, a memory 14, and one or more input/output devices and/or interfaces 16 coupled to one another via, for example, one or more buses 18 and/or other connections. As examples, computing environment 10 may include an IBM® Power® processor offered by International Business Machines Corporation, Armonk, New York; an HP Superdome with Intel® processors offered by Hewlett Packard Co., Palo Alto, California; and/or other machines based on architectures offered by International Business Machines Corporation, Hewlett Packard, Intel Corporation, Oracle, or others. Intel is a trademark or registered trademark of Intel Corporation or its subsidiaries in the United States and other countries.

Native central processing unit 12 includes one or more native registers 20, such as one or more general purpose registers and/or one or more special purpose registers used during processing within the environment. These registers include information that represents the state of the environment at any particular point in time.

Moreover, native central processing unit 12 executes instructions and code that are stored in memory 14. In one particular example, the central processing unit executes emulator code 22 stored in memory 14. This code enables the computing environment configured in one architecture to emulate another architecture. For instance, emulator code 22 allows machines based on architectures other than, e.g., the IBM® z/Architecture® instruction set architecture, such as Power processors, HP Superdome servers or others, to emulate the z/Architecture instruction set architecture and to execute software and instructions developed based on the z/Architecture instruction set architecture. z/Architecture is a trademark or registered trademark of International Business Machines Corporation in at least one jurisdiction.

Figure 5B:
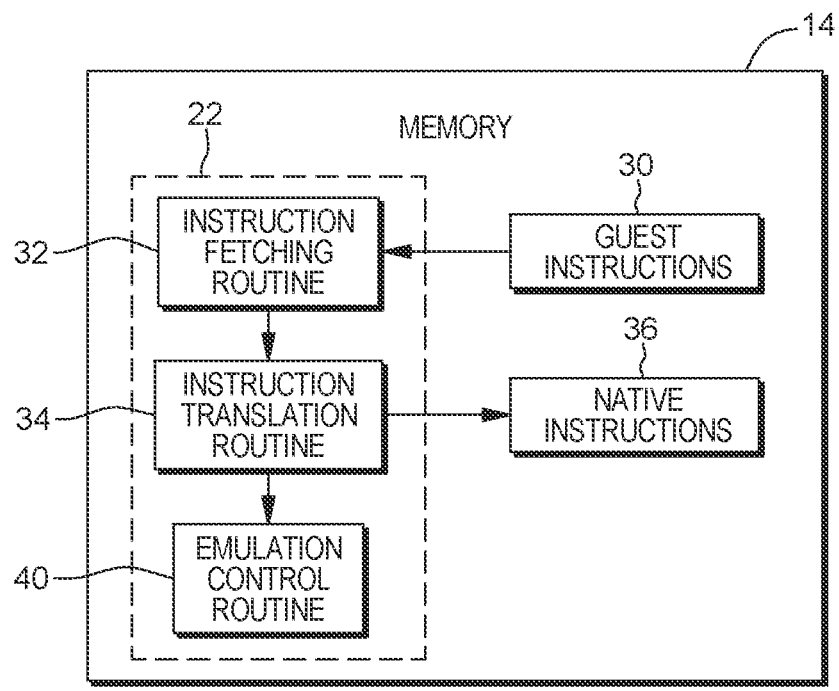
FIG. 5B depicts further details of the memory of FIG. 5A, in accordance with one or more aspects of the present invention.

Further details relating to emulator code 22 are described with reference to FIG. 5B. Guest instructions 30 stored in memory 14 comprise software instructions (e.g., correlating to machine instructions) that were developed to be executed in an architecture other than that of native CPU 12. For example, guest instructions 30 may have been designed to execute on a processor based on the z/Architecture instruction set architecture, but instead, are being emulated on native CPU 12, which may be, for example, an Intel processor. In one example, emulator code 22 includes an instruction fetching routine 32 to obtain one or more guest instructions 30 from memory 14, and to optionally provide local buffering for the instructions obtained. It also includes an instruction translation routine 34 to determine the type of guest instruction that has been obtained and to translate the guest instruction into one or more corresponding native instructions 36. This translation includes, for instance, identifying the function to be performed by the guest instruction and choosing the native instruction(s) to perform that function.

Further, emulator code 22 includes an emulation control routine 40 to cause the native instructions to be executed. Emulation control routine 40 may cause native CPU 12 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 36 may include loading data into a register from memory 14; storing data back to memory from a register; or performing some type of arithmetic or logic operation, as determined by the translation routine.

Each routine is, for instance, implemented in software, which is stored in memory and executed by native central processing unit 12. In other examples, one or more of the routines or operations are implemented in firmware, hardware, software or some combination thereof. The registers of the emulated processor may be emulated using registers 20 of the native CPU or by using locations in memory 14. In embodiments, guest instructions 30, native instructions 36 and emulator code 22 may reside in the same memory or may be disbursed among different memory devices.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention. For instance, each may be configured to perform static block mass/frequency prediction, and/or to perform one or more other aspects of the present invention.

Although various embodiments are described herein, many variations and other embodiments are possible without departing from a spirit of aspects of the present invention. It should be noted that, unless otherwise inconsistent, each aspect or feature described herein, and variants thereof, may be combinable with any other aspect or feature.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
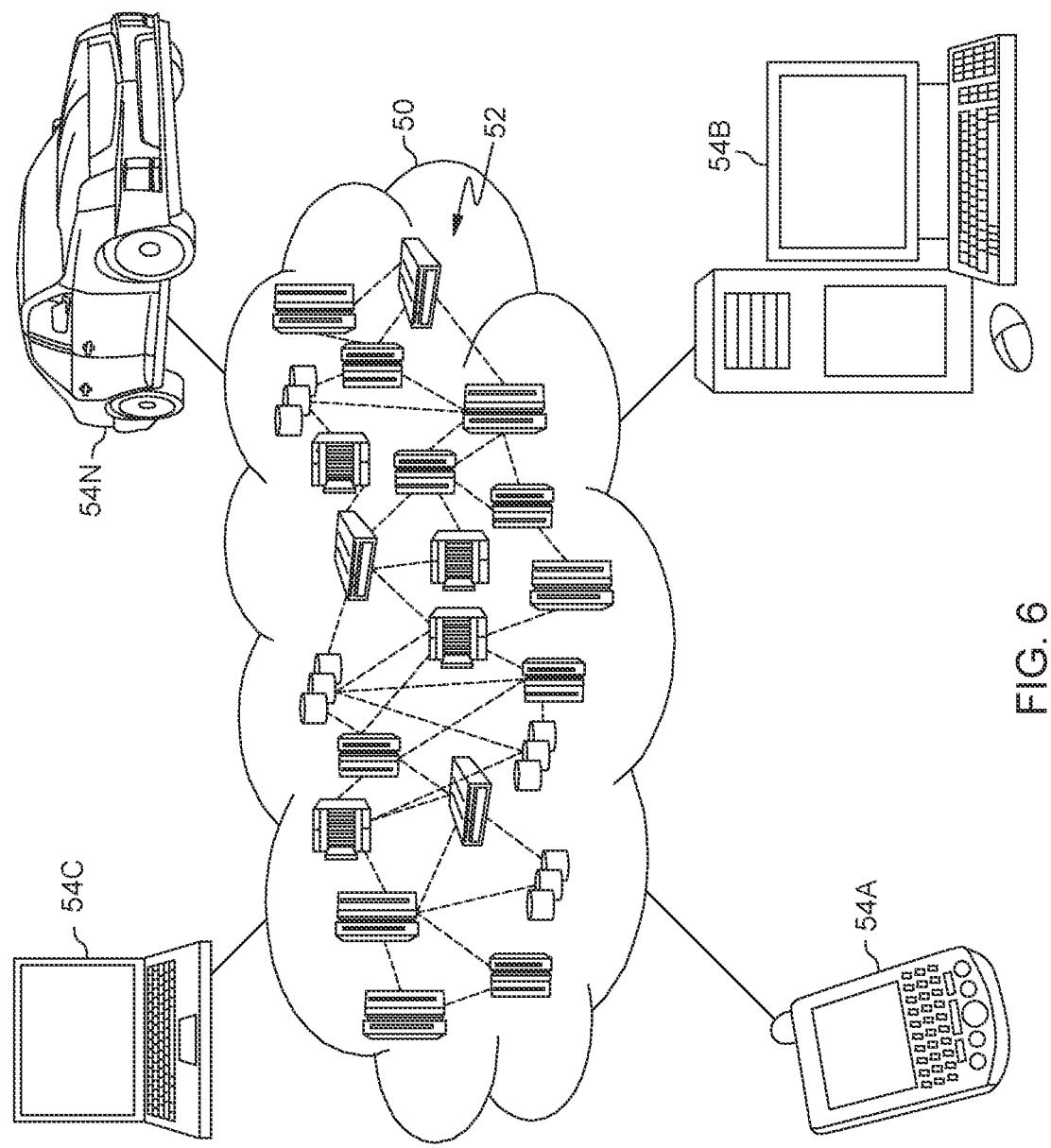
FIG. 6 depicts one embodiment of a cloud computing environment, in accordance with one or more aspects of the present invention.

Referring now to FIG. 6, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 52 and cloud computing environment 50 can communicate with any type of computerized device over any type of network and/or network addressable connection (e.g., using a web browser).

Figure 7:
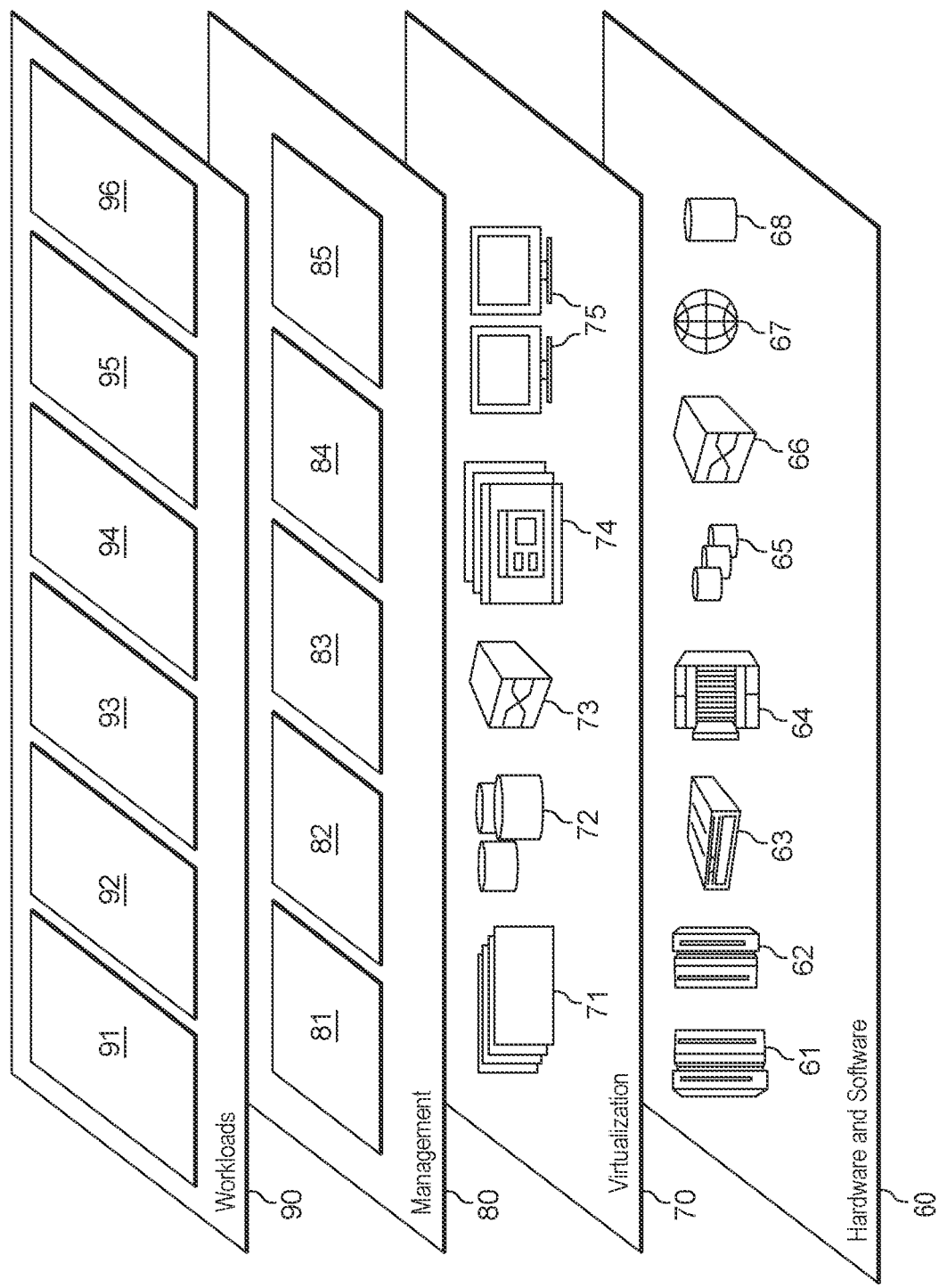
FIG. 7 depicts one example of abstraction model layers, in accordance with one or more aspects of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and static block mass/frequency prediction processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, different types of compilers and/or intermediate representations and/or techniques may be employed. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
    one or more computer readable storage media and program instructions collectively stored on the one or more computer readable storage media to perform a method comprising:
        compiling computer code, using a compiler executing within the computing environment, to generate as output compiled code, the compiled code including an irreducible loop for which a block frequency is to be statically determined; and
        statically determining the block frequency of a block in the irreducible loop, the statically determining including:
            splitting an incoming block mass among multiple loop headers of the irreducible loop to determine an initial mass for the block;
            iteratively performing a bottom-up traversal and a top-down traversal of a plurality of loops of the computer code including the irreducible loop to update a mass of the block, the iteratively performing commencing with propagating the initial mass of the block to one or more blocks of one or more loops of the plurality of loops and continuing with propagating and updating masses of select blocks of the plurality of loops until a predefined point is reached providing a resulting mass for the block; and
            determining the block frequency of the block using the resulting mass, wherein the block frequency is to be used in processing associated with the computer code.

2. The computer program product of claim 1, wherein the iteratively performing for an iteration of the bottom-up traversal includes:
    propagating a partial mass of the block to one or more successor blocks of one or more enclosing parent loops to update one or more partial masses of the one or more successor blocks, wherein the partial mass of the block is the initial mass at a first iteration of the bottom-up traversal and an updated mass at one or more subsequent iterations of the bottom-up traversal, based on the one or more subsequent iterations being performed; and
    continuing with bottom-up traversal of the plurality of loops until an outermost loop is reached, in which partial masses of successor blocks in the plurality of loops are updated.

3. The computer program product of claim 2, wherein the iteratively performing for an iteration of the top-down traversal includes:
    determining a predecessor mass for a predecessor block preceding the block for which the block frequency is being determined, the determining the predecessor mass using at least one partial mass determined from the iteration of the bottom-up traversal; and
    updating the partial mass of the block using a branch frequency of the block and the predecessor mass, the updating the partial mass of the block providing the updated mass for the block.

4. The computer program product of claim 3, wherein the iteratively performing for the iteration of the top-down traversal further includes:
    determining the branch frequency of the block, the determining the branch frequency comprising:
        checking whether there are multiple edges to the block;
        coalescing multiple branch frequencies of the multiple edges to the block, based on the checking indicating that there are multiple edges to the block, to provide the branch frequency; and
        using the branch frequency of a single edge to the block, based on the checking indicating that there are no multiple edges to the block.

5. The computer program product of claim 3, wherein the iteration of the bottom-up traversal and the iteration of the top-down traversal are repeated at least once to determine the resulting mass for the block.

6. The computer program product of claim 1, wherein the splitting the incoming block mass is based on start terms of geometric series formed from incident branch frequencies of the block.

7. The computer program product of claim 1, wherein the statically determining the block frequency further comprises modeling the irreducible loop as a directed acyclic graph, wherein one or more back edges of the irreducible loop are ignored, and wherein the iteratively performing the bottom-up traversal includes propagating the initial mass based on the directed acyclic graph.

8. The computer program product of claim 1, wherein the iteratively performing the bottom-up traversal includes:
propagating a partial mass of the block of the irreducible loop to a successor block of an enclosing loop of the irreducible loop to update a previous mass of the successor block to provide an updated successor mass of the successor block, the partial mass being the initial mass of the block in an initial bottom-up traversal and an updated mass of the block in other bottom-up traversals;
distributing the updated successor mass to one or more other blocks of one or more other loops to update one or more other successor masses of the one or more other blocks; and
repeating the distributing until a selected point is reached.

9. The computer program product of claim 8, wherein the selected point is an outermost enclosing loop.

10. The computer program product of claim 1, wherein the predefined point comprises a fixed point convergence of the resulting mass of the block.

11. A computer system for facilitating processing within a computing environment, the computer system comprising:
a memory; and
at least one processor in communication with the memory, wherein the computer system is configured to perform a method, said method comprising:
compiling computer code, using a complier executing within the computing environment, to generate as output complied code, the complied code including an irreducible loop for which a block frequency is to be statically determined; and
statically determining the block frequency of a block in the irreducible loop, the statically determining including:
splitting an incoming block mass among multiple loop headers of the irreducible loop to determine an initial mass for the block;
iteratively performing a bottom-up traversal and a top-down traversal of a plurality of loops of the computer code including the irreducible loop to update a mass of the block, the iteratively performing commencing with propagating the initial mass of the block to one or more blocks of one or more loops of the plurality of loops and continuing with propagating and updating masses of select blocks of the plurality of loops until a predefined point is reached providing a resulting mass for the block; and
determining the block frequency of the block using the resulting mass, wherein the block frequency is to be used in processing associated with the computer code.

12. The computer system of claim 11, wherein the iteratively performing for an iteration of the bottom-up traversal includes:
propagating a partial mass of the block to one or more successor blocks of one or more enclosing parent loops to update one or more partial masses of the one or more successor blocks, wherein the partial mass of the block is the initial mass at a first iteration of the bottom-up traversal and an updated mass at one or more subsequent iterations of the bottom-up traversal, based on the one or more subsequent iterations being performed; and
continuing with bottom-up traversal of the plurality of loops until an outermost loop is reached, in which partial masses of successor blocks in the plurality of loops are updated.

13. The computer system of claim 12, wherein the iteratively performing for an iteration of the top-down traversal includes:
determining a predecessor mass for a predecessor block preceding the block for which the block frequency is being determined, the determining the predecessor mass using at least one partial mass determined from the iteration of the bottom-up traversal; and
updating the partial mass of the block using a branch frequency of the block and the predecessor mass, the updating the partial mass of the block providing the updated mass for the block.

14. The computer system of claim 13, wherein the iteratively performing for the iteration of the top-down traversal further includes:
determining the branch frequency of the block, the determining the branch frequency comprising:
checking whether there are multiple edges to the block;
coalescing multiple branch frequencies of the multiple edges to the block, based on the checking indicating that there are multiple edges to the block, to provide the branch frequency; and
using the branch frequency of a single edge to the block, based on the checking indicating that there are no multiple edges to the block.

15. The computer system of claim 11, wherein the splitting the incoming block mass is based on start terms of geometric series formed from incident branch frequencies of the block.

16. A computer-implemented method of facilitating processing within a computing environment, the computer-implemented method comprising:
compiling computer code, using a complier executing within the computing environment, to generate as output complied code, the complied code including an irreducible loop for which a block frequency is to be statically determined; and
statically determining the block frequency of a block in the irreducible loop, the statically determining including:
splitting an incoming block mass among multiple loop headers of the irreducible loop to determine an initial mass for the block;
iteratively performing a bottom-up traversal and a top-down traversal of a plurality of loops of the computer code including the irreducible loop to update a mass of the block, the iteratively performing commencing with propagating the initial mass of the block to one or more blocks of one or more loops of the plurality of loops and continuing with propagating and updating masses of select blocks of the plurality of loops until a predefined point is reached providing a resulting mass for the block; and determining the block frequency of the block using the resulting mass, wherein the block frequency is to be used in processing associated with the computer code.

17. The computer-implemented method of claim 16, wherein the iteratively performing for an iteration of the bottom-up traversal includes:
propagating a partial mass of the block to one or more successor blocks of one or more enclosing parent loops to update one or more partial masses of the one or more successor blocks, wherein the partial mass of the block is the initial mass at a first iteration of the bottom-up traversal and an updated mass at one or more subsequent iterations of the bottom-up traversal, based on the one or more subsequent iterations being performed; and
continuing with bottom-up traversal of the plurality of loops until an outermost loop is reached, in which partial masses of successor blocks in the plurality of loops are updated.

18. The computer-implemented method of claim 17, wherein the iteratively performing for an iteration of the top-down traversal includes:
determining a predecessor mass for a predecessor block preceding the block for which the block frequency is being determined, the determining the predecessor mass using at least one partial mass determined from the iteration of the bottom-up traversal; and
updating the partial mass of the block using a branch frequency of the block and the predecessor mass, the updating the partial mass of the block providing the updated mass for the block.

19. The computer-implemented method of claim 18, wherein the iteratively performing for the iteration of the top-down traversal further includes:
determining the branch frequency of the block, the determining the branch frequency comprising:
checking whether there are multiple edges to the block;
coalescing multiple branch frequencies of the multiple edges to the block, based on the checking indicating that there are multiple edges to the block, to provide the branch frequency; and
using the branch frequency of a single edge to the block, based on the checking indicating that there are no multiple edges to the block.

20. The computer-implemented method of claim 16, wherein the splitting the incoming block mass is based on start terms of geometric series formed from incident branch frequencies of the block.

* * * * *